(12) United States Patent
Sim et al.

(10) Patent No.: US 11,878,489 B2
(45) Date of Patent: Jan. 23, 2024

(54) METHOD FOR MANUFACTURING A SANDWICH PANEL FOR A VEHICLE AND A SANDWICH PANEL FOR A VEHICLE

(71) Applicants: HYUNDAI MOTOR COMPANY, Seoul (KR); KIA MOTORS CORPORATION, Seoul (KR); IL KWANG POLYMER. CO., LTD, Hwaseong-si (KR)

(72) Inventors: Jae-Gi Sim, Seoul (KR); Hyo-Moon Joo, Seoul (KR); Yong-Wan Jo, Iksan-si (KR)

(73) Assignees: HYUNDAI MOTOR COMPANY, Seoul (KR); KIA MOTORS CORPORATION, Seoul (KR); IL KWANG POLYMER. CO., LTD, Hwaseong-si (KR)

(*) Notice: Subject to any disclaimer, the term of this patent is extended or adjusted under 35 U.S.C. 154(b) by 147 days.

(21) Appl. No.: 17/154,840

(22) Filed: Jan. 21, 2021

(65) Prior Publication Data
US 2022/0063246 A1 Mar. 3, 2022

(30) Foreign Application Priority Data
Sep. 2, 2020 (KR) .................. 10-2020-0111596

(51) Int. Cl.
| B32B 15/08 | (2006.01) |
| C23F 1/02 | (2006.01) |
| B32B 37/15 | (2006.01) |
| B32B 38/06 | (2006.01) |

(Continued)

(52) U.S. Cl.
CPC ........ *B32B 15/08* (2013.01); *B29C 45/14311* (2013.01); *B32B 15/18* (2013.01);
(Continued)

(58) Field of Classification Search
None
See application file for complete search history.

(56) References Cited

U.S. PATENT DOCUMENTS 6,060,150 A * 5/2000 Nakatani .......... H01L 23/49861
428/209
8,283,043 B2 10/2012 Naritomi
(Continued)

FOREIGN PATENT DOCUMENTS

| FR | 3 036648 A | * | 12/2016 |
| JP | 5237303 B2 | | 7/2013 |

(Continued)

OTHER PUBLICATIONS

Machine English Translation of FR-3036648 A; Dec. 2016 (Year: 2016).*

*Primary Examiner* — Shamim Ahmed
(74) *Attorney, Agent, or Firm* — Lempia Summerfield Katz LLC

(57) ABSTRACT

A method for manufacturing a sandwich panel for a vehicle includes: etching a sheet, which etches one surface of a metal sheet; pressing the sheet, which forms a pattern of a specific shape on the one surface of the metal sheet; laminating a pair of the metal sheets; and performing injection-molding by injecting a plastic resin into the laminated pair of the metal sheets. The method may improve the bonding performance of the sandwich panel, thereby improving the degree of freedom of shape due to the press-molding.

3 Claims, 11 Drawing Sheets

(51) Int. Cl.
*B32B 15/20* (2006.01)
*B32B 15/18* (2006.01)
*B29C 45/14* (2006.01)
*B32B 37/12* (2006.01)
*B32B 38/10* (2006.01)
*B29K 705/02* (2006.01)
*B29K 705/12* (2006.01)
*B29L 31/30* (2006.01)

(52) U.S. Cl.
CPC .............. *B32B 15/20* (2013.01); *B32B 37/12* (2013.01); *B32B 37/15* (2013.01); *B32B 38/06* (2013.01); *B32B 38/10* (2013.01); *B29C 2045/14532* (2013.01); *B29C 2045/14868* (2013.01); *B29K 2705/02* (2013.01); *B29K 2705/12* (2013.01); *B29K 2995/0002* (2013.01); *B29L 2031/3002* (2013.01); *B32B 2250/40* (2013.01); *B32B 2310/0409* (2013.01); *B32B 2311/00* (2013.01); *B32B 2605/00* (2013.01)

(56) References Cited

U.S. PATENT DOCUMENTS

| 8,696,923 | B2 | 4/2014 | Naritomi |
| 2010/0279120 | A1 | 11/2010 | Naritomi |
| 2010/0304083 | A1* | 12/2010 | Naritomi ........... B29C 45/14221 428/141 |
| 2012/0297851 | A1 | 11/2012 | Hong |
| 2013/0004790 | A1 | 1/2013 | Naritomi |
| 2016/0221301 | A1* | 8/2016 | Okumura ................. B32B 7/04 |
| 2017/0129217 | A1* | 5/2017 | Andoh .............. B29C 45/14311 |
| 2017/0301840 | A1* | 10/2017 | Azami ................. B32B 27/205 |
| 2019/0127606 | A1* | 5/2019 | Akiyama ................. H05K 3/38 |
| 2020/0157394 | A1* | 5/2020 | Tomatsu ................. C09J 11/04 |

FOREIGN PATENT DOCUMENTS

| KR | 101262264 B1 | 5/2013 | |
| WO | WO-2018110293 A1 * | 6/2018 | ............. B29C 45/14 |

* cited by examiner

METHOD FOR MANUFACTURING A SANDWICH PANEL FOR A VEHICLE AND A SANDWICH PANEL FOR A VEHICLE

CROSS-REFERENCE TO RELATED APPLICATION

This application claims priority to Korean Patent Application No. 10-2020-0111596, filed on Sep. 2, 2020, which is incorporated herein by reference in its entirety.

BACKGROUND OF THE DISCLOSURE

Field of the Disclosure

The present disclosure relates to a method for manufacturing a sandwich panel for a vehicle part and to the sandwich panel thereof.

Description of Related Art

A sandwich panel having excellent durability and various functions for application for a material of a vehicle part is needed.

As illustrated in FIG. 1, a conventional sandwich panel for a vehicle part is manufactured by inducing bonding between a sheet 1 and a resin 3. A bonding film 2 is used for bonding between the sheet 1 made of a metallic material such as steel or aluminum and the resin 3.

Therefore, if such a general bonding film structure is applied, there is a limit to the molding of the sandwich panel. Upon press-molding of a complicated shape, the bonding film layer is separated by the peeling or breakage of the bonding film. There is a concern that a gap between the resin and the metal occurs as a result.

Therefore, there is a limit to manufacturing the sandwich panel for a vehicle part due to a limit to the degree of freedom of the design.

As described above, in the bonding using the conventional bonding method, the bonding force between the sheets is decreased, such that the bonding is impossible after the pattern is molded. There is also a concern of causing leakage.

In addition, the bonding using the welding method has a number of processes. There is also a limit to the molding area, thereby not drawing out the result suitable for the vehicle part.

The sandwich panel may be variously applied in the field of building materials. However, there is a limit to introducing the sandwich panel into manufacturing a part requiring a press formation for a complicated shape such as a vehicle part due to the peeling phenomenon between interfaces.

However, when the bonding characteristics of a vehicle part may be continuously maintained, the sandwich panel may be applied to: an air layer for improving insulation, noise, vibration, and harshness (NVH), and the like; and a channel through the formation of the flow field, or the like, together with simple parts including a roof, a hood, an electronic box for an eco-friendly vehicle, and a battery case. Such a sandwich panel is substantially beneficial to manufacturing the vehicle.

The contents described in the Description of Related Art section are to help understand the background of the present disclosure. The Description of Related Art section may include what is not previously known to those having ordinary skill in the art to which the present disclosure pertains.

SUMMARY OF THE DISCLOSURE

The present disclosure is intended to solve the above problems. An object of the present disclosure is to provide a method for manufacturing a sandwich panel for a vehicle and to provide the sandwich panel thereof. The method and sandwich panel may improve bonding performance of a panel, thereby improving the degree of freedom of a shape due to the press-molding.

A method for manufacturing a sandwich panel for a vehicle according to one aspect of the present disclosure includes: etching a sheet, which etches one surface of a metal sheet; pressing the sheet, which forms a pattern of a specific shape on the one surface of the metal sheet; laminating a pair of the metal sheets; and performing injection-molding by injecting a plastic resin into the laminated pair of the metal sheets.

The etching of the sheet may etch the metal sheet by immersing the metal sheet into an etching solution.

As a result, an undercut may be formed on the one surface of the metal sheet by the etching of the sheet.

In addition, a void portion having a pattern shape formed by the pressing of the sheet may be formed inside the pair of the laminated metal sheets, and the performing of the injection-molding may inject the plastic resin into the void portion.

In addition, the shapes of the patterns formed on the pair of the metal sheets may be the same.

In a sandwich panel for a vehicle according to another aspect of the present disclosure, a resin bonding layer is formed to be laminated between a pair of metal sheets whose surfaces are etched, and the resin bonding layer is directly bonded to the pair of the metal sheets.

In addition, an undercut may be formed on the surface bonded with the resin bonding layer of the metal sheet.

Next, in a sandwich panel for a vehicle according to still another aspect of the present disclosure, a plurality of void portions are formed inside a pair of metal sheets laminated by etching the surfaces of the metal sheets, and at least one of the plurality of void portions is filled with a plastic resin.

In addition, the plurality of void portions may be spaced apart from each other and formed parallel to each other.

At least one of the plurality of void portions may be in a hollow state.

Alternatively, both ends of the void portion in the hollow state may communicate with the outside.

In addition, the plurality of void portions may be spaced apart from each other and formed parallel to each other, and a resin bonding layer filled with the plastic resin and an air layer in the hollow state may be alternately formed.

Furthermore, the plastic resin may be filled in the wall surface of the air layer in the hollow state in a form of surrounding the air layer.

Next, in a sandwich panel for a vehicle according to yet another aspect of the present disclosure, a void portion is formed inside a pair of metal sheets laminated by etching the surfaces of the metal sheets, and both ends of the void portion communicate with the outside.

In addition, the plastic resin may be filled in the wall surface of the void portion in a form of surrounding the void portion.

The sandwich panel manufactured by the method for manufacturing the sandwich panel according to the present disclosure improves a bonding strength by 50 to 100% compared to the fusion material, compared to the sandwich panel manufactured by the general bonding film. The sandwich panel according to the present disclosure exerts the bonding strength by 35 MPa or more.

In addition, an anchor type sandwich panel is bonded via mechanical bonding between the resin itself and the metal interface without applying the bonding film and thus the degree of freedom of molding is high. The peeling strength of the bonding area is thereby strengthened.

Therefore, it is possible to manufacture a vehicle part such as a roof or a hood with a high degree of freedom of molding, rather than the conventional non-molding panel for building materials.

In the case of a blank type sandwich panel, the sheet capable of forming a specific pattern may be manufactured, thereby manufacturing a lightweight and specific functional sheet.

Therefore, the sandwich panel may be utilized as a sandwich sheet for reinforcing rigidity, a sandwich sheet for optimizing NVH, or a part for a cooling system having the cooling channel formed therein.

In addition, the sandwich panel may be applied to an electronic/electric part for a vehicle for which the demand is increasing, a battery case, and the like, may improve the NVH of the vehicle, may improve fuel efficiency due to the insulation effect when applied to the roof, and may decrease the weight of the vehicle by utilizing the rigidity-reinforced material.

DESCRIPTION OF SPECIFIC EMBODIMENTS

To fully understand the present disclosure, operational advantages of the present disclosure, and objects achieved by the implementation of the present disclosure, reference should be made to the accompanying drawings illustrating various embodiments of the present disclosure and the contents described in the accompanying drawings.

In describing the embodiments of the present disclosure, the descriptions of known technologies or repetitive descriptions, which may unnecessarily obscure the gist of the present disclosure, have been reduced or omitted.

Figure 1:
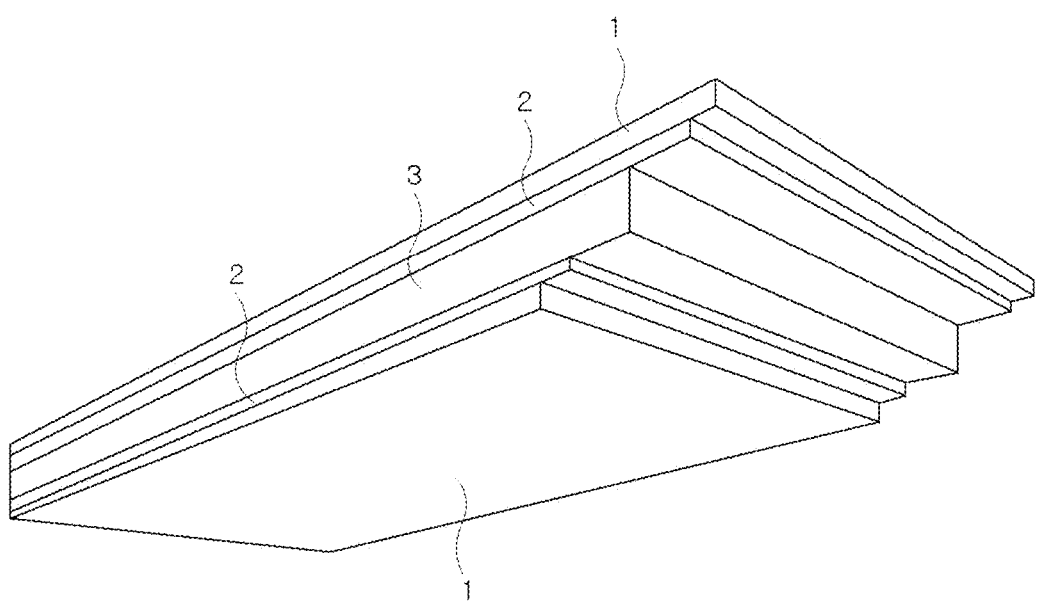
FIG. 1 schematically illustrates a configuration of a conventional sandwich panel.
Figure 2:
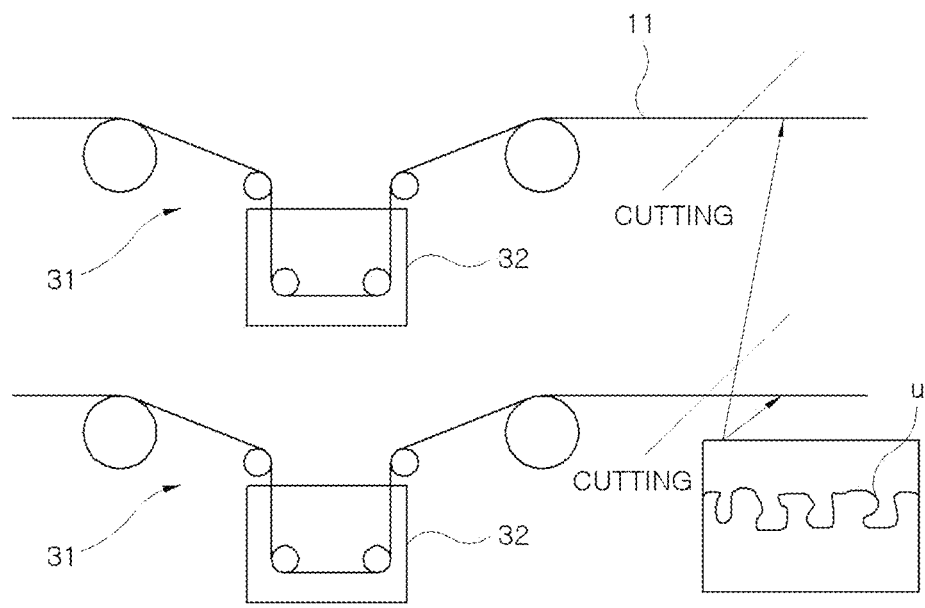
FIGS. 2-4 sequentially illustrate a process of manufacturing a sandwich panel according to the present disclosure.
Figure 3:
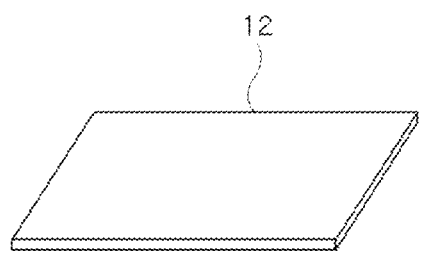
Figure 3:
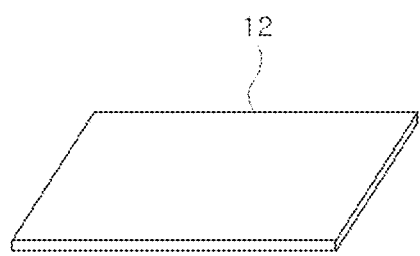
Figure 4:
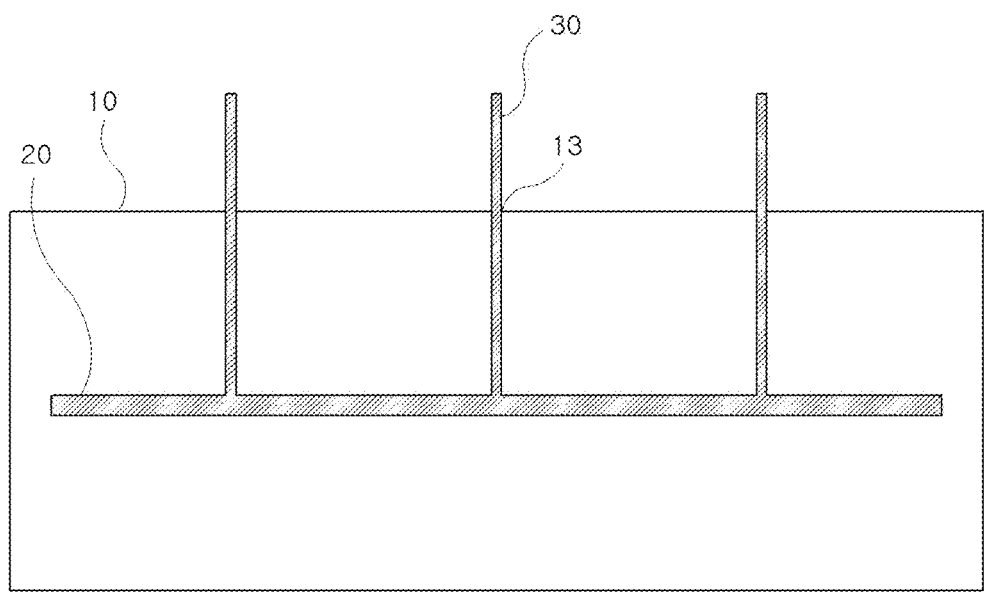

FIGS. 2-4 sequentially illustrate a process of manufacturing a sandwich panel according to the present disclosure. Hereinafter, a method for manufacturing a sandwich panel for a vehicle, and a sandwich panel according to an embodiment of the present disclosure, are described with reference to FIGS. 2-4.

The present disclosure relates to a method for manufacturing a sandwich panel exerting durability suitable for a vehicle part by directly bonding the sheet and the resin without interposing a bonding film or the like therebetween.

The present disclosure relates to manufacturing the sandwich panel by giving an undercut or protrusion shape to a resin bonding surface of a metal sheet.

The undercut may be generated using a difference in the degree of corrosion of fine elements in the metal. Conventional metal surface treatment methods include a shot blast, a laser, or the like. However, these have a limit to forming the undercut and have a bonding force smaller than that of the conventional bonding fusion method upon injection bonding.

The present disclosure goes through a sheet etching step in order to form the undercut on the surface of the metal sheet.

As illustrated in FIG. 2, a metal sheet 11 is immersed in an etching water tank 32 in the continuous roll process by a roll forming apparatus 31. Thus, the surface of the metal sheet 11 may be formed with the undercut 'u' by the etching.

Next, a pattern is formed on the etched surface of a metal sheet blank 12 illustrated in FIG. 3 having gone through the aforementioned process. The pattern to be formed is to form a void, as described below. An engraved pattern having a specific shape is formed on the etched surface of a pair of metal sheets through the sheet press step. The forms of the patterns to be formed on the pair of metal sheets may be the same.

Therefore, as illustrated in FIG. 4, a sandwich panel 10, in which the void portion 20 is formed, is manufactured according to the patterns. The patterned surfaces of the pair of metal sheets 12 are laminated to face each other. The sandwich panel 10 is manufactured by injecting a plastic resin 30 through an injector 13 formed in the laminated sandwich panel 10.

Figure 5A:
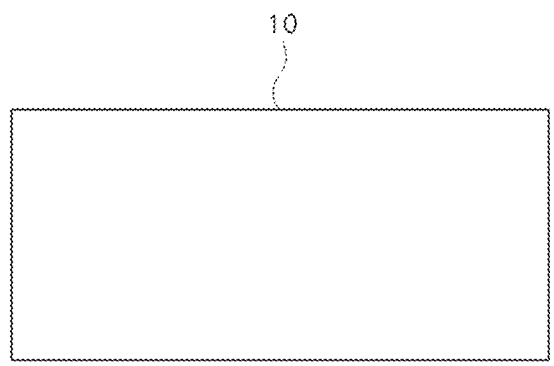
FIG. 5A illustrates a planar shape of a sandwich panel according to a first embodiment of the present disclosure.
Figure 5B:
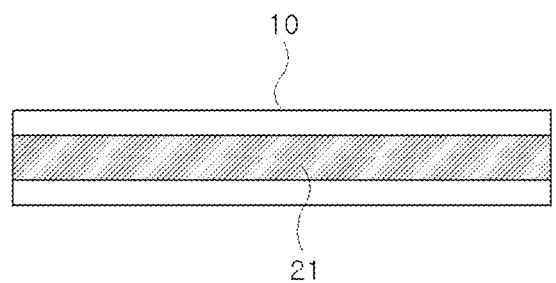
FIG. 5B illustrates a side cross-sectional shape of the sandwich panel of FIG. 5A.

The sandwich panel 10 according to a first embodiment of the present disclosure is manufactured as described above. As illustrated in FIGS. 5A and 5B, the metal sheets are laminated by interposing a plastic resin between the metal sheets. The metal sheets may be made of steel or aluminum. The sandwich panel may be manufactured by maintaining a strong bonding force between the metal sheets and the resin without a bonding film by the undercut shape formed on the metal sheets.

The sandwich panel 10 according to the first embodiment of the present disclosure is characterized in that the plastic resin is completely filled between the metal sheets to form a resin bonding layer 21, thereby having strong bondability. The void portions having various forms may be formed therein by a sheet press step in addition to the overall resin bonding layer.

The sandwich panel 10 according to the first embodiment of the present disclosure has very good bonding strength and thus is easily applied to a vehicle body or a body part.

Hereinafter, sandwich panels 10 according to various embodiments implemented by the void portions having various forms are described.

Figure 6A:
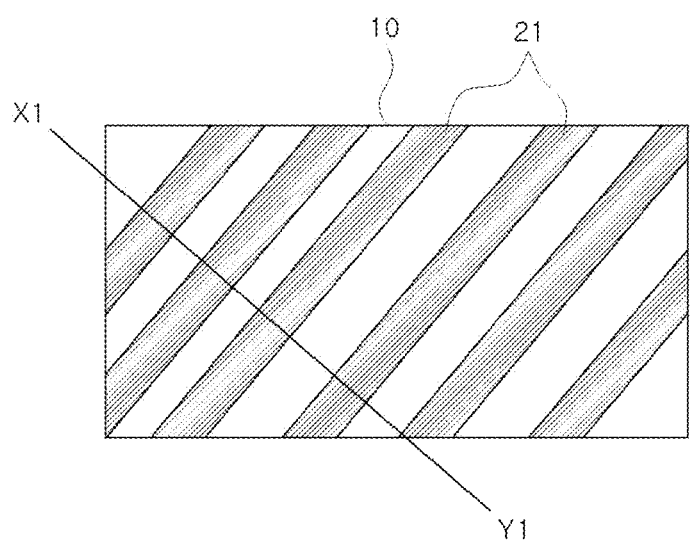
FIG. 6A illustrates a planar cross-sectional shape of a sandwich panel according to a second embodiment of the present disclosure.
Figure 6B:
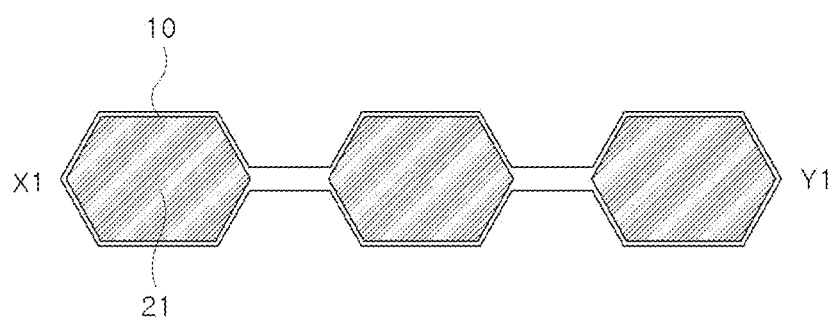
FIG. 6B illustrates a cross-sectional shape taken along the line X1-Y1 of the sandwich panel illustrated in FIG. 6A.

FIG. 6A illustrates a planar cross-sectional shape of a sandwich panel 10 according to a second embodiment of the present disclosure. FIG. 6B illustrates a cross-sectional shape taken along the line X1-Y1 of the sandwich panel 10 illustrated in FIG. 6A.

As illustrated, the sandwich panel 10 according to a second embodiment is characterized in that the void portion is formed in an oblique direction on the plane. The plastic resin is filled in the void portion, such that the resin bonding layer 21 is formed between the metal sheets.

The oblique direction is not necessarily needed. As illustrated, a plurality of void portions are formed to be spaced apart from each other at intervals.

The rigidity may be further reinforced by the sandwich panel, and the bonding strength may be controlled by a sheet shape. The rigidity of the manufactured sandwich sheet is improved compared to the first embodiment in that the improvement in the rigidity is differentiated according to the type of the pattern. Generally, upon patterning unidirectionally, the strength is improved by 30% or more.

Figure 7A:
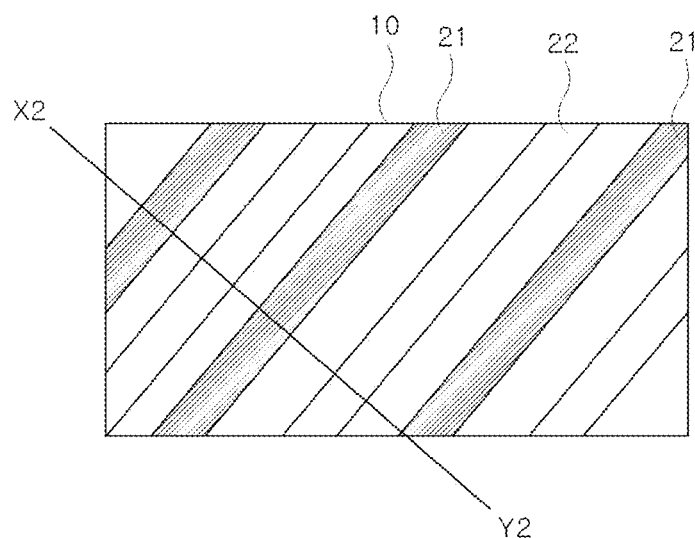
FIG. 7A illustrates a planar cross-sectional shape of a sandwich panel according to a third embodiment of the present disclosure.
Figure 7B:
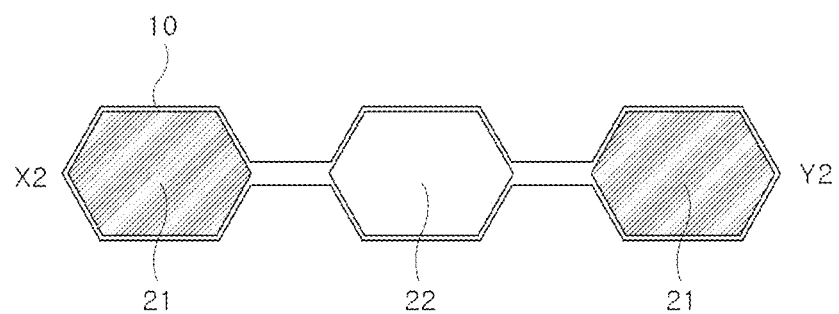
FIG. 7B illustrates a cross-sectional shape taken along the line X2-Y2 of the sandwich panel illustrated in FIG. 7A.

FIG. 7A illustrates a planar cross-sectional shape of a sandwich panel 10 according to a third embodiment of the present disclosure. FIG. 7B illustrates a cross-sectional shape taken along the line X2-Y2 of the sandwich panel 10 illustrated in FIG. 7A.

As illustrated, the sandwich panel 10 according to a third embodiment is the same as the second embodiment in that the void portion is formed in the oblique direction on the plane.

However, all of the plurality of void portions spaced apart from each other at intervals are not filled with the resin in the resin bonding layer 21. Some of the void portions are not filled with the resin and are formed as air layers 22 having a hollow shape.

This may further improve the NVH and insulation characteristics compared to the aforementioned embodiments. Also, the resin bonding layers 21 and the air layers 22 may be alternately formed or alternated.

The additional air layer can maximize insulation performance and improve NVH with the rigidity reinforcement, since the air layer is a superior insulation material. Insulation performance is thereby maximized and NVH with the rigidity reinforcement is also improved.

Therefore, when the insulation performance of a roof and a headliner is improved, it is possible to improve fuel efficiency and reduce the weight of the vehicle. In addition, it is possible to reinforce the rigidity of a door or a hood inner panel.

Figure 8A:
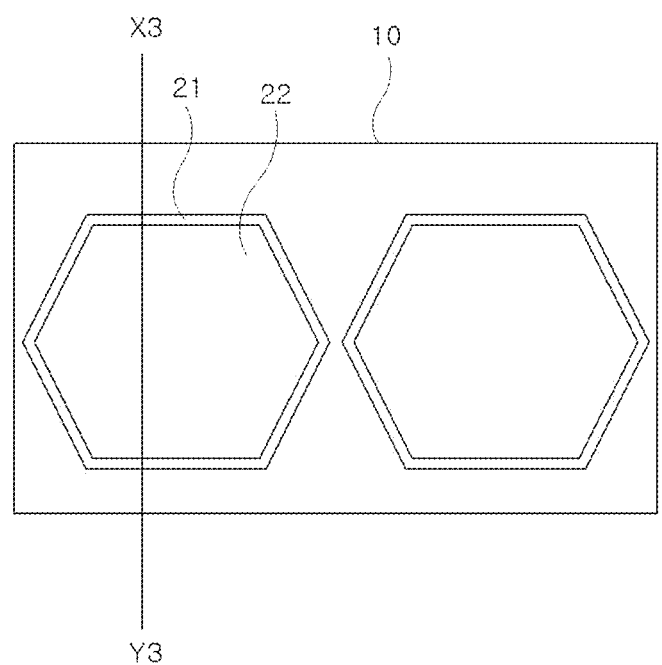
FIG. 8A illustrates a planar cross-sectional shape of a sandwich panel according to a fourth embodiment of the present disclosure.
Figure 8B:
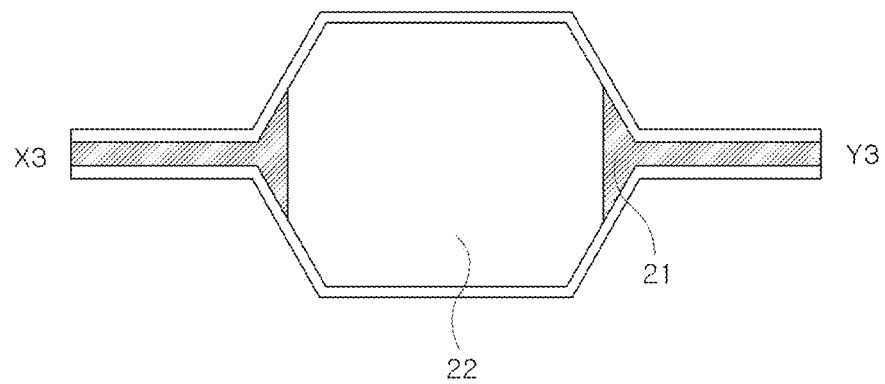
FIG. 8B illustrates a cross-sectional shape taken along the line X3-Y3 of the sandwich panel illustrated in FIG. 8A.

FIG. 8A illustrates a planar cross-sectional shape of a sandwich panel according to a fourth embodiment of the present disclosure. FIG. 8B illustrates a cross-sectional shape taken along the line X3-Y3 of the sandwich panel 10 illustrated in FIG. 8A.

As illustrated, the sandwich panel 10 according to a fourth embodiment is characterized in that a plurality of void portions having constant forms are formed between the sheets. A void portion is formed as an air layer 22 having a hollow shape and the resin bonding layer 21 is formed in a wall surface of the air layer 22 and formed surrounding the air layer 22.

The sandwich panel 10 has the strong insulation feature.

By controlling the air layer to occupy the volume as much as possible, it is possible to isolate the air layer after blank molding with a structure having a large rigidity effect in a hexagonal embossed type. Improved insulation is thereby implemented.

Figure 9A:
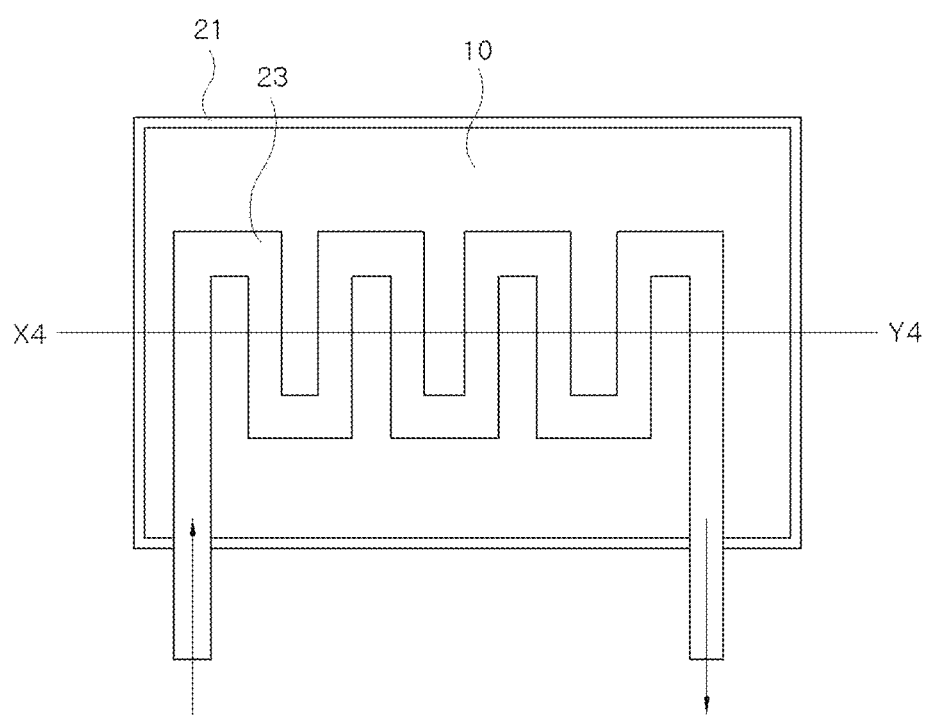
FIG. 9A illustrates a planar cross-sectional shape of a sandwich panel according to a fifth embodiment of the present disclosure.
Figure 9B:
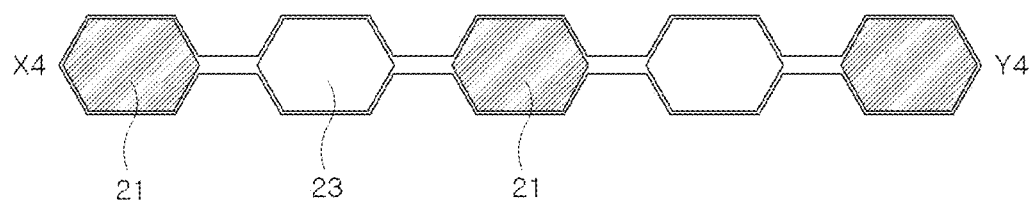
FIGS. 9B and 9C illustrate cross-sectional shapes taken along the line X4-Y4 of the sandwich panel illustrated in FIG. 9A.
Figure 9C:
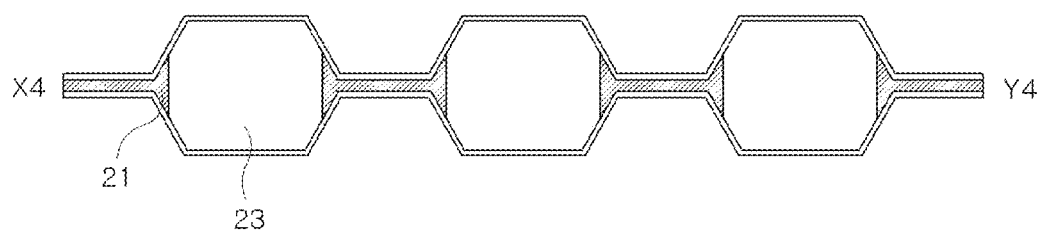

Lastly, FIG. 9A illustrates a planar cross-sectional shape of a sandwich panel 10 according to a fifth embodiment of the present disclosure. FIGS. 9B and 9C illustrate cross-sectional shapes taken along the line X4-Y4 of the sandwich panel 10 illustrated in FIG. 9A.

As illustrated, the sandwich panel 10 according to a fifth embodiment has void portions, which are formed to be bent, i.e., change directions, several times and to be evenly distributed to the entire area between the sheet. The sandwich panel 10 is particularly formed so that both ends of the void portion are opened, i.e., communicate with the outside.

Therefore, the void portion according to the fifth embodiment forms a cooling channel 23 so that coolant may circulate between the sheets.

According to a configuration illustrated in FIG. 9A, as described in the second or third embodiment, some of the void portions may be formed with the resin bonding layer 21 and other of the void portions may be formed with the cooling channel 23. Such a configuration does not match the cross-sectional shape illustrated in FIG. 9A. Such a configuration may be implemented by forming both ends of the cooling channel 23 to communicate with the outside and by forming the resin bonding layer 21 separately from the cooling channel 23.

Alternatively, according to a configuration illustrated in FIG. 9B, as described in the fourth embodiment, the void portion may be formed as the cooling channel 23 and the resin bonding layer 21 may be formed on the wall surface of the cooling channel 23.

To implement the cooling channel, a structure for preventing leakage may be manufactured by inserting a separate pipe or welding the cooling channel. However, in the case of the fifth embodiment of the present disclosure, both surfaces of the blank formed with the cooling channel are bonded by the plastic injection, thereby manufacturing a simple and integral structure and increasing the degree of freedom of design.

As described above, the present disclosure includes treating a surface of a sheet, thereby improving bondability, such that it is possible to manufacture a sandwich panel in which a pattern is freely formed. Thus, various void portions may be formed between the sheets.

As described above, the present disclosure has been described with reference to the drawings but is not limited to the described embodiments. It should be apparent to those having ordinary skill in the art that the present disclosure may be variously modified and changed without departing from the spirit and scope of the present disclosure. Therefore, the modified examples or the changed examples should be included in the claims of the present disclosure, and the scope of the present disclosure should be construed based on the appended claims.

What is claimed is:

1. A method for manufacturing a sandwich panel for a vehicle, the method comprising:
   etching a pair of metal sheets, which etches one surface of each metal sheet of the pair of metal sheets;
   pressing the pair of metal sheets, which forms a pattern of a same specific shape on the one surface of each metal sheet;
   laminating the pair of metal sheets so that the one surface of each metal sheet of the pair of metal sheets, on which the pattern is formed, faces the other; and performing injection-molding by injecting a plastic resin into a void portion formed inside the laminated pair of the metal sheets through an injector formed in the sandwich panel, wherein the void portion is formed by the pattern on each metal sheet of the pair of metal sheets.

2. The method of claim 1, wherein etching the pair of metal sheets etches each metal sheet by immersing each metal sheet into an etching solution.

3. The method of claim 2, wherein an undercut is formed on the one surface of each metal sheet of the pair of metal sheets by etching the pair of metal sheets.

\* \* \* \* \*